(12) United States Patent
Muyshondt

(10) Patent No.: US 10,285,233 B2
(45) Date of Patent: May 7, 2019

(54) APPARATUS FOR CONTROLLING MULTIPLE ELECTRICAL LOADS USING A MULTI-DRIVER/MULTI-TOPOLOGY REGULATOR DESIGN

(71) Applicant: Muyshondt Enterprises, Inc., Leander, TX (US)

(72) Inventor: Jorge Enrique Muyshondt, Austin, TX (US)

(73) Assignee: Muyshondt Enterprises, Inc., Leander, TX (US)

( * ) Notice: Subject to any disclaimer, the term of this patent is extended or adjusted under 35 U.S.C. 154(b) by 76 days.

(21) Appl. No.: 15/499,800

(22) Filed: Apr. 27, 2017

(65) Prior Publication Data

US 2018/0235046 A1 Aug. 16, 2018

Related U.S. Application Data

(60) Provisional application No. 62/459,939, filed on Feb. 16, 2017.

(51) Int. Cl.
*H05B 33/08* (2006.01)
*G01R 15/08* (2006.01)

(52) U.S. Cl.
CPC ......... *H05B 33/0845* (2013.01); *G01R 15/08* (2013.01); *H05B 33/0809* (2013.01); *Y02B 20/346* (2013.01)

(58) Field of Classification Search
None
See application file for complete search history.

(56) References Cited

U.S. PATENT DOCUMENTS

| | | | |
|---|---|---|---|
| 6,814,941 B1 | 11/2004 | Naunheimer et al. | |
| 8,089,254 B2* | 1/2012 | Khaligh | H02M 3/1582 323/259 |
| 2015/0208472 A1* | 7/2015 | Liu | H05B 33/0815 315/206 |

* cited by examiner

*Primary Examiner* — Dedei K Hammond
(74) *Attorney, Agent, or Firm* — Koffsky Schwalb LLC; Mark I. Koffsky

(57) ABSTRACT

Described is an improved LED-based flashlight with discrete mechanical, electrical or electro-mechanical actuation to adjust operation of the flashlight. The control of power to the device is accomplished by switching brightness modes electronically through use of multiple drivers and/or dynamic microcontrollers. The system may apply to current regulators as well as voltage regulators. Efficiency may be optimized to minimize power losses by operating each driver chip within fixed bands, handing off regulation to other chips that function well at different input currents or voltages.

23 Claims, 5 Drawing Sheets

APPARATUS FOR CONTROLLING MULTIPLE ELECTRICAL LOADS USING A MULTI-DRIVER/MULTI-TOPOLOGY REGULATOR DESIGN

REFERENCE TO PRIOR APPLICATIONS

This application claims the benefit of U.S. Provisional Patent Application Ser. No. 62/459,939, filed on Feb. 16, 2017.

FIELD OF THE DISCLOSURE

The present invention relates to the field of controlling multiple electrical loads, include light-emitting diodes ("LEDs"), using a multi-driver/multi-topology regulator design.

BACKGROUND

An LED is a two-lead semiconductor light source having a p-n junction diode that emits light when activated. When a suitable voltage is applied to the leads, electrons are able to recombine with electron holes within the device, releasing energy in the form of photons. This effect is called electroluminescence, and the color of the light (corresponding to the energy of the photon) is determined by the energy band gap of the semiconductor. LEDs have many advantages over incandescent light sources including lower energy consumption, longer lifetime, improved physical robustness, smaller size, and faster switching.

LEDs are electronically controlled using a device called a "driver" (also known as a "regulator", "converter", "light engine", and other similar terms describing the same device), which generally function by providing either a constant current or constant voltage to the LED. These drivers are typically set up in a straightforward manner to ensure the proper current and voltage drives the LED. If the forward voltage of the LED is higher than the voltage of the power source, a "Boost" or "Step-Up" driver is used, and if the forward voltage of the LED is lower than then voltage of the power source, a "Buck" or "Step-Down" driver is used. Other driver topologies including but not limited to "Buck-Boost", "Charge Pumps", "Linear Drivers", "Cúk", and other types are used for the purpose of controlling LED brightness. LEDs may be composed of single colors or multiple colors.

Drivers may be single mode, multi-mode, or fully-variable, depending on the control arrangement. They may be controlled in an analog manner, or via a digital control arrangement using a microcontroller or similar device.

A single topology driver is typically used to control the LED within an LED flashlight. Even if the LED flashlight has a variable brightness control, the control for brightness is often located on the same single driver topology that drives the flashlight itself.

Turning to FIG. 1, shown is a prior art schematic 10 with a single driver 12 driving a single LED or LED array 14. As shown in FIG. 2, these prior art devices have only one specific point of maximum efficiency, which the design must be optimized to meet. Graph 20 shows an example efficiency plot for such a single driver. As seen from graph 20, the exemplary single driver achieves 94% efficiency at 350 mA of current but only has 40% efficiency at 10 mA of current. For any point outside of this point of maximum efficiency, the effective battery life of a portable electronic device (such as a flashlight), is reduced, sometimes greatly.

There are many deficiencies to this solution, namely:
1) A single-chip or single-topology driver can generally only control a single LED or LED array.
2) As shown in FIG. 2, a single driver has a specific point of maximum efficiency, which the design must be optimized to meet. For any point outside of this point of maximum efficiency, the effective battery life of an portable electronic device (such as a flashlight), is reduced, sometimes greatly.

Accordingly there is a need for an improved design of LED-based flashlights to improve efficiency and battery life.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
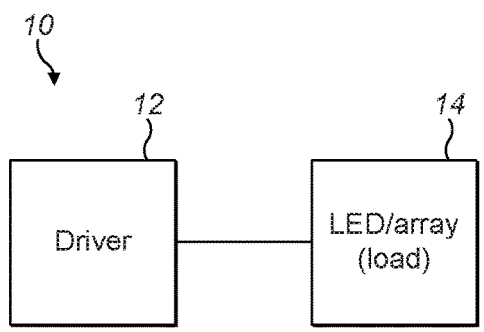
FIG. 1 shows a prior art single-driver/single-load system.
Figure 2:
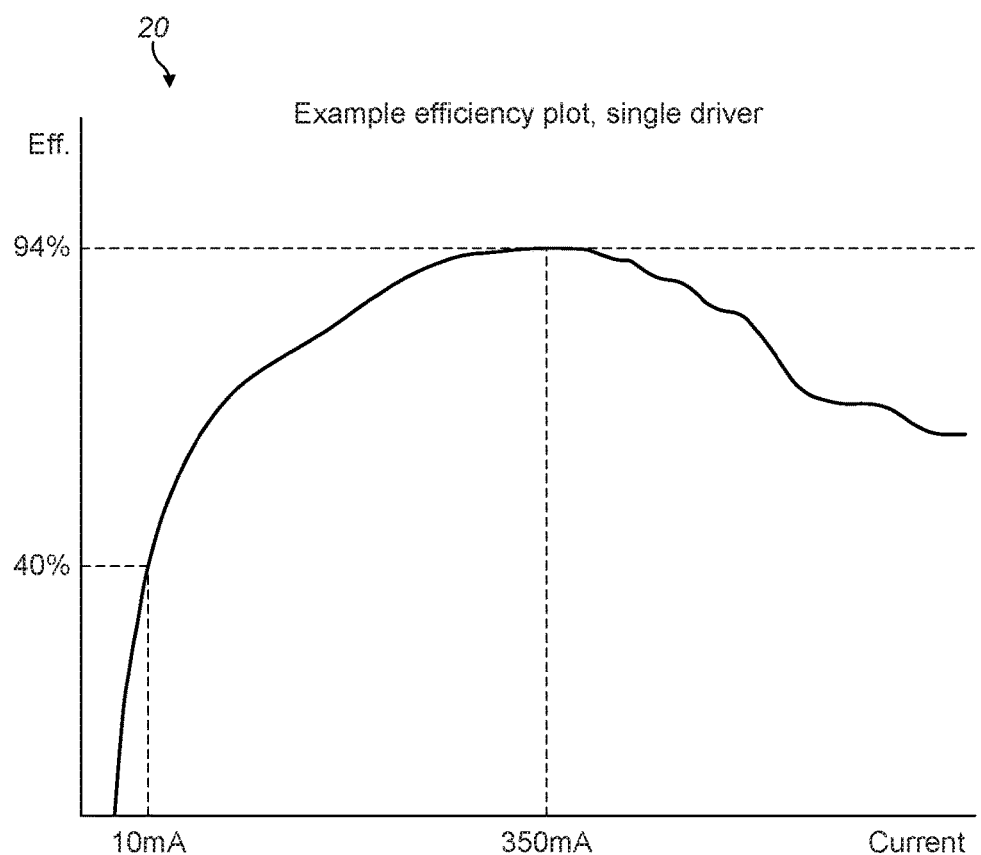
FIG. 2 shows a plotted graph showing efficiency versus current.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In general, a flashlight has an input voltage from a battery. This battery voltage may be above or below the load voltage. If the battery voltage is above the load voltage, a buck converter may be used; if the battery voltage is below the load voltage, a boost converter may be used. In cases where the battery voltage is about the load voltage, a buck/boost design may be used.

The input voltage in a flashlight is typically a battery, and excepting in cases where there is an unlimited power source (such as a wall outlet), the input voltage will always be diminishing as the battery is drained. This may necessitate use of different drivers depending on what the input is (thusly the progression from an initial "buck" mode, to a "buck/boost", to a "boost" mode operation described in the application, depending on the state of charge of the battery).

The invention may be structured such that it selectively uses any number of these drivers in a single "driver block". This means that "n" number of drivers of any topology may be used for the output, which are selectable by a microcontroller. The microcontroller selects the appropriate driver for the given input voltage and the desired output parameters.

These drivers function either in a voltage mode, or a current mode, meaning that they enforce either an output voltage across a load, or an output current across a load. The magnitude of voltage and/or current is determined by components in the feedback loop (or other control loop) of the driver (resistors, potentiometers, inductors, capacitors, etc.).

I. Multiple Drivers

The present invention calls for a multi-driver and/or multi-topology approach to regulate power to an LED or multiple LEDs or any other electrical load.

Typically, a driver is considered a single-chip item such as a boost driver. In this application, a "driver" may also incorporate multiple chips, each of which includes multiple independent "sub-drivers" operating as one driver. Thus, the figures may include labels as "Chip A" and "Chip B" inside a single "driver block" to illustrate this aspect of the invention.

Figure 3:
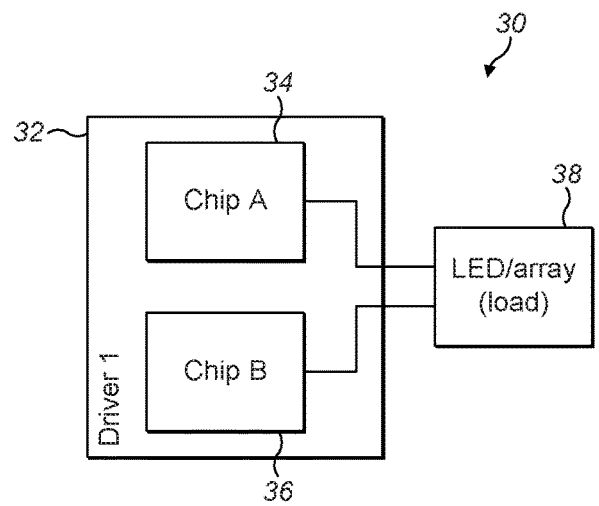
FIG. 3 shows a schematic with multiple drivers controlling a single load.

Turning to FIG. 3, shown is a schematic 30 with multiple drivers controlling a single load. A driver 32 includes driver chip A 34 and driver chip B 36 that control an LED or LED array 38. Although only two driver chips A and B 34, 36 are shown, three, four or any number of multiple driver chips can be used. This method also applies more broadly to any electrical load, regardless of type, and is not specifically limited to LEDs. Further this system may apply to voltage regulators as well as current regulators.

Figure 4:
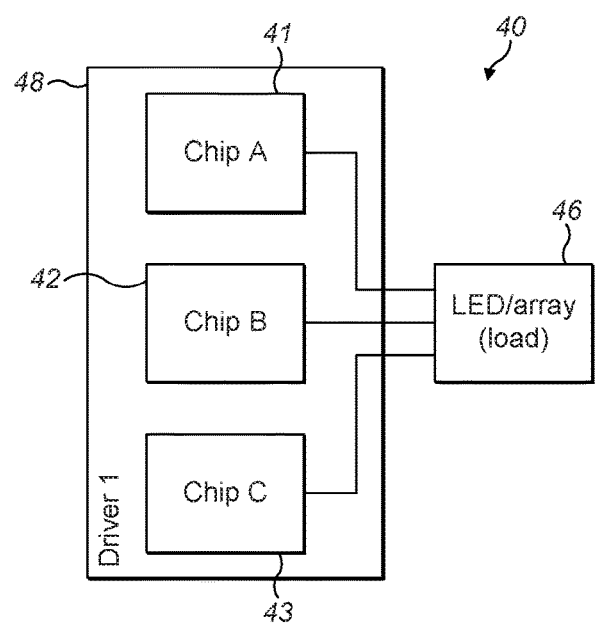
FIG. 4 shows another schematic with multiple drivers with different efficiency bands controlling a single load.

Efficiency may be optimized to minimize power losses by operating each driver chip within fixed bands, handing off regulation to other chips that function well at different input and output power levels. For example, shown in FIG. 4 is a schematic 40 assuming a boost-only driver arrangement, Chip A 41 functions at 90% efficiency from 500 mA<$I_{load}$≤1000 mA. Chip B 42 functions at 90% efficiency from 100<$I_{load}$≤500 mA. Chip C 43 functions at 90% efficiency from 0≤$I_{load}$≤100 mA. In this arrangement, a driver 48 can be created to drive the load (LED array) 46 whereby Chip A 41 is selected for operation in at any current between 500 mA<$I_{load}$≤1000 mA, Chip B 42 for 100<$I_{load}$≤500 mA, and Chip C 43 for 0≤$I_{load}$≤100 mA, thereby keeping overall system efficiency high, and reducing needless power losses.

Figure 5:
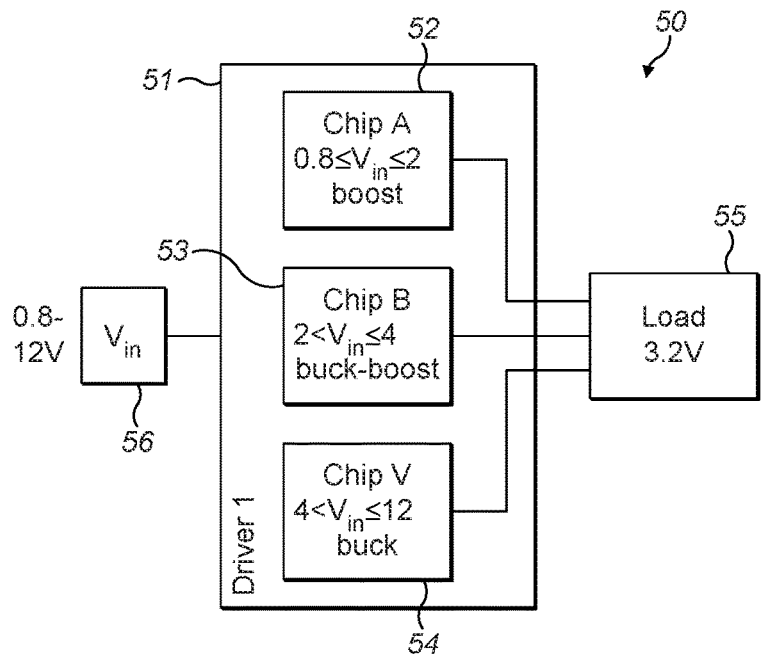
FIG. 5 shows another schematic with multiple drivers with differential voltages controlling a single load.

This concept may be further applied to a multi-topology type arrangement, for using multiple driver topologies based on the input voltage to the system. For example:

i) Turning to FIG. 5, a circuit 50 where the load voltage 55 is 3.2 volts, and the input voltage 56 can vary from 0.8 volts to 12 volts. For all voltages between 4V-12V, a buck driver 54 (or multiple drivers, structured similarly to a buck driver 54) can be used, with a boost driver 56 (or multiple drivers, structured similarly to boost driver 56) being active for the 0.8-3.2V range. Though this example may function with a just the two topologies listed, it is possible to further add a third driver 55 (or drivers) arrangement in by supplementing with a buck-boost converter for ranges near the load voltage (i.e. 0.8≤$V_{in}$≤2 Volts for Boost-Only, 2<$V_{in}$≤4 Volts for Buck-Boost, and 4<$V_{in}$≤12 Volts for Buck-Only).

Figure 6:
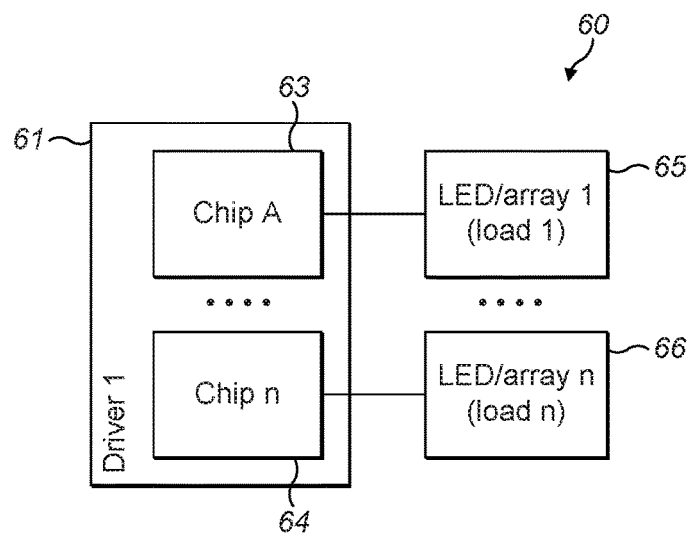
FIG. 6 shows another schematic with a series of multiple drivers controlling a series of loads.

One result of using the different voltage ranges of the three example drivers in FIG. 5 is efficiency: Buck/Boost drivers tend to be less efficient that either Buck, or Boost drivers alone, and have more limited voltage ranges. FIG. 5 may be further extended to have n1 boost drivers, n2 buck/boost drivers, and n3 buck drivers, each assigned to a specific efficiency band, selected by the microcontroller according to desired output power.

ii) As shown in FIG. 6, there is no limit to the voltage ranges or specific number of drivers and topologies such a system can accommodate. A system 60 shows a driver 61 with multiple chips 1 63 through chip n 64. Each of the chips may drive multiple LED loads 1 65 through n 66.

Figure 7:
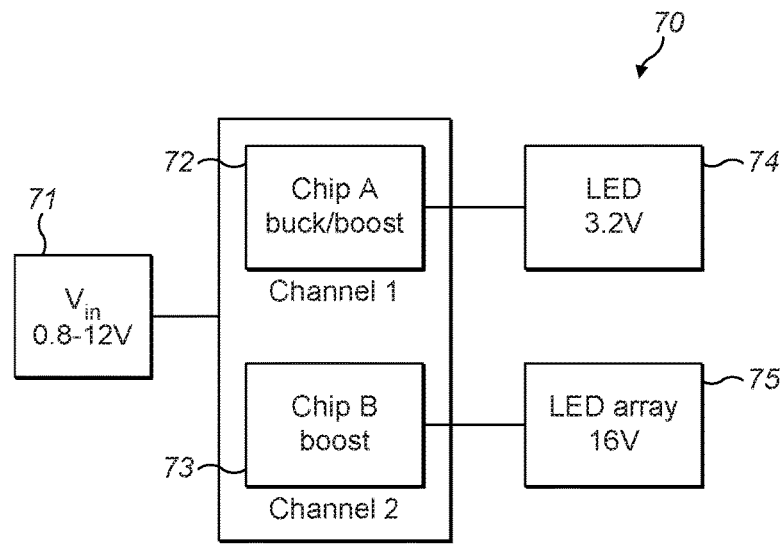
FIG. 7 shows another schematic with multiple channels controlling multiple loads.

This system can also be extended to an arrangement of multiple loads, whereby any plurality of drivers can control multiple discrete load channels, optimizing for efficiency according to the descriptions set forth above. As shown in FIG. 7, a circuit 70 for a flashlight might have an operating range 71 of 0.8-12 volts with a design with one or more channels in use. One channel (Channel One 72) may be a single LED 73 with a forward voltage of 3.2 volts. Another channel (Channel Two 74) may be one or more LEDs with a higher forward voltage—such as, for example a 5-LED arrangement 76 with a total forward voltage of 16V. Channel One can function in the modes described above (with boost drivers, buck drivers or boost/buck drivers). Channel Two in this case would require only a boost driver (or drivers, as described above) to control it.

The description is not limited to channel numbers and can be implemented in as few as one channel or higher, without limit on the number of channels.

II. Dynamic Microcontrollers

The present invention advances beyond the prior art by eliminating the need for discrete mechanical actuation to adjust operation of the flashlight, and allows for control of power to the device by switching brightness modes electronically through use of multiple drivers and/or dynamic microcontrollers.

In prior art devices, a driver typically has its output parameters set by use of a resistor in the feedback loop of the cathode of the light. A few drivers have control capabilities on the anode side of the circuit, or other control loops, but these are less common. In these devices, a driver is set to a specific value by way of a resistor, and the effective output is adjusted by repeatedly turning the driver on and off by using a Pulse Width Modulation (PWM) signal to an "Enable pin" (similar names include, but are not limited to, "SHUTDOWN", "POWER", etc.) which enable or disable the device depending on whether a high or low signal is detected on that pin. But PWM signals applied to LEDs can cause a disorienting strobe-like effect in certain circumstances, particularly in the rain, or when used in a situation where items are moving through the light controlled via that method.

In a prior art patent U.S. Pat. No. 6,841,941 B2 to Kim teaches that it is possible to change brightness levels through discrete mechanical switching, including by adjusting the resistances seen in the direct feedback or control loop of a flashlight. Kim also teaches that a mechanical switch can be connected in such a way as to mechanically connect different elements of a circuit to actuate changes in output operation of a flashlight. Specifically, turning or twisting a switch closes different discrete circuit connections which adjust operation of the flashlight accordingly. Kim further teaches that this switching mechanism should be contained within the tailcap. But multi-stage mechanical switches are typically very cumbersome to design and manufacture, and tend to decrease in reliability and increase in cost with each added mechanical stage. Also, keeping the switching mechanism in the tailcap alone is limiting since it may be better to place the switching mechanism in other parts of the flashlight.

This invention negates the use of either PWM or unnecessary mechanical complications of the prior art.

Figure 8:
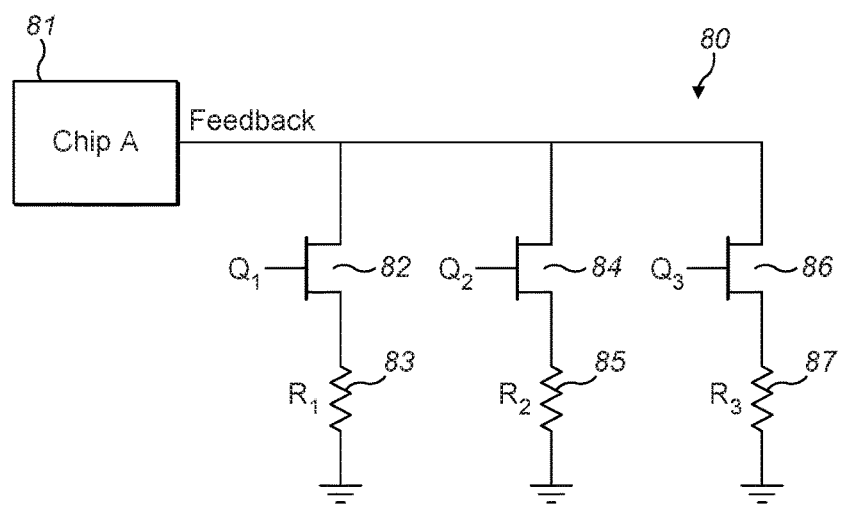
FIG. 8 shows another schematic showing a feedback circuit using transistors.

In one embodiment, this invention comprises a manner of adjusting output power of a driver circuit through selectively altering the resistance in either an anode or cathode based control scheme using a series of one or more resistors selectively activated through transistors. Turning to FIG. 8, shown is a schematic 80 with a chip 81 with adjustable output power based on feedback. In this case the output power of the chip 81 is adjusted by selective activation of transistor $Q_1$ 82 connected to resistor $R_1$ 83, transistor $Q_2$ 84 connected to resistor $R_2$ 85, and/or transistor $Q_3$ 86 connected to resistor $R_3$ 87. In this case, different resistors $R_1$ 83, $R_2$ 85, $R_3$ 87 are connected through transistors $Q_1$ 82. $Q_2$ 84, $Q_3$ 86 which can be opened or closed to adjust the resistance in the feedback loop for chip 81, thusly affecting a change in output power. The transistors and resistors may be used alone, or in parallel, to affect changes in output power, without limit to the number of control channels used.

Figure 9:
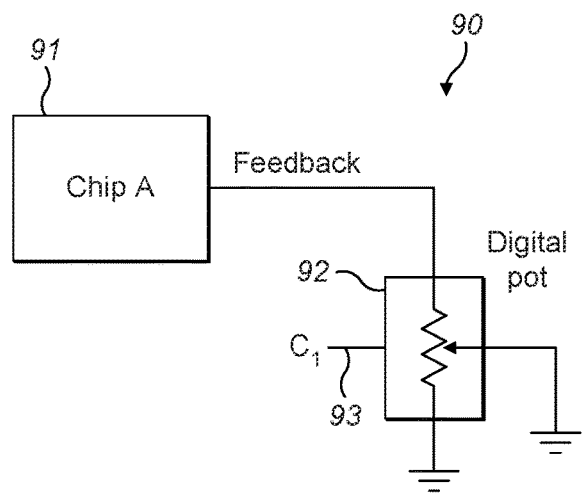
FIG. 9 shows another schematic showing a feedback circuit using a digital potentiometer.

In another embodiment, a digital potentiometer may be installed in the feedback loop of the driver. Turning to FIG. 9, shown is a schematic 90 with a chip 91 attached to a digital potentiometer 92. An external control signal $C_1$ 93 adjusts the resistance in the digital potentiometer 92, which affects a change in output power. Any means of either electronically or mechanically selecting different resistors in a control loop to adjust output may be used, including, but not limited to, using a mechanical or electrical switch to control the digital potentiometer 92 or the transistors in FIG. 8.

These methods may be further extended to driver circuits that adjust current in a non-resistive manner, by allowing switching between whatever elements are required to affect a change in output currents (including, but not limited to, selecting between capacitors and inductors).

One method of switching between drivers is by using an analog switch, whereby continued depression of a spring or other actuation device can select different elements within a circuit to adjust brightness. Similarly, depression of a spring or other actuation device may activate different discrete driver chips as appropriate for the chosen design. It is possible to actuate this same effect through use of a digital microcontroller, a mechanical switch of any kind, or through a potentiometer. It is also possible to adjust the output of any driver circuit that has any kind of feedback mechanism, whether as arranged as a control structure in a cathode-based feedback loop, or an anode-based feedback loop, or any other location within the circuit to affect a change in output power.

By using an arrangement as described in this section, the use of PWM and its resultant drawbacks is eliminated for the design. Further, the mechanical complications are entirely eliminated, allowing for the design to feature a switching mechanism as simple as an on-off switch to provide complete output control to the flashlight.

The methods described herein are applicable to controlling single-load devices, or multi-load devices, and switching between output states on each. These principles are also directly applicable to a multi-chip/multi topology arrangement. For example, continuing on the two-load example in FIG. 7, a device could be made such that an external 5-LED ring is activated by an initial trigger, with brightness modes adjusted on that ring alone. After a certain number of presses, the second load (in this case a single LED) may be activated, and have its brightness adjusted in a similar manner. The first load may remain active, or be deactivated, or otherwise have its brightness changed when the second load is powered.

As another example, an LED-based flashlight has two sets of LEDs controllable by a single, multi-topology driver solution. The flashlight uses two discrete driver chips and a microcontroller to switch between the chips and to adjust the brightness levels of each. The LED flashlight selectively activates and deactivates driver chips using, for example, their enable pins, and adjusts the brightness levels in a manner that is not PWM (Pulse Width Modulation). In the case of one of the chips, this is done by selectively turning transistors on and off to adjust resistance in the feedback loop to affect a change in output power.

As another example, an LED-based flashlight is activated by turning the system on by activating a switch (located in the tailcap or elsewhere). The microcontroller may then activate the system on the lowest mode it is programmed for. When power is disconnected and reconnected, the system is turned on again, and the microcontroller may activate it on the second mode. If this is done again, the microcontroller may switch to the third mode. This may all be done on an outer ring of LEDs. On the fourth power cycle, the microcontroller may activate both the center LED, and the ring of LEDs. On the fifth power cycle, the microcontroller may activate the outer ring at the same power as the fourth power cycle but at higher power for the center LED. On the sixth cycle, the microcontroller may reset to the first setting. The Center LED may be powered by a buck/boost driver, and the outer ring may be powered by a boost driver.

After several seconds, the memory of the system may be reset, allowing the flashlight to always start in low mode after it has been off for a time. It is also possible to provide a memory function, whereby the flashlight may always activate at the last used state (mode).

The switch applies power to the entire system—the microcontroller detects power cycles and adjusts elements of the circuit to affect changes in output power according to its programming.

There is no limit to how many modes are had by either the LED ring, or the center LED. The center LED and LED ring may or may not be on at the same time. The system may, or may not, have mode memory. The system may or may not use a plurality of drivers and topologies as previously described.

The invention described herein is intended principally for use with LEDs, but are applicable to any device that requires power control, and can help to solve efficiency problems in any electronic device.

The present system may be made fully dynamic, adjusting between different output levels and driver chips as desired. The system may use any specific control mechanism, including, but not limited to, an analog switching mechanism or a digital microcontroller. The ability to switch between multiple drivers through the use of such a mechanical or electronic switches may take place anywhere in the flashlight. Locations include, but are not limited to, a switch in the tailcap, one contained inside the "head" of the flashlight, or one contained on the side of the flashlight. The switches may be mechanical, or electronic, with no regard to one method or another as a switching mechanism.

In the prior art, a mechanical switch would switch between discrete physical elements in a circuit to apply power in a particular manner to affect a change in output. Specifically, a physical switch located in a tailcap of a flashlight could jump between different resistors in a feedback loop, or potentially complete a ground connection for separate elements in a circuit, to either adjust output power or activate different loads, respectively.

The present invention dispenses with the need for special mechanical switches to physically connect different elements of a circuit to affect a change in output. The present invention uses a microcontroller that is actuated by an external signal, and then executes a program pursuant to that signal that adjusts the output state of any driver or drivers as previously described. This actuation can be triggered by, but not limited to:

1. Use of a switch (analog or digital), where the pulses from each on/off cycle are logged by the microcontroller, which then adjusts the output state according to its program.

2. Use of a potentiometer (or digital equivalent, including, but not limited to, a rotary encoder), whereby the microcontroller reads the voltage across a potentiometer (or receives a digital signal from a rotary encoder), and then adjusts the output state according to its programming based on the measurement.

3. Use of a hall-effect or other magnetic sensor, whereby a magnetic field can be read either as an on/off signal, similar to a switch, or dynamically similar to a potentiometer, to adjust the output state according to its programming, based on the measured value.

These are three example methods by which a microcontroller can be actuated, but the examples should be construed as illustrative rather than limiting. Any other method that can achieve similar changes in state detectable by a microcontroller follows the same basic principles outlined here.

The actuation of a microcontroller by any of the example methods listed above then results in the microcontroller outputting a signal according to its programming to the driver circuitry that adjusts elements in the feedback or other control loop, such as the transistors and resistors in FIG. 8, or a digital potentiometer in FIG. 9.

These methods may be used to control a single load or multiple loads, from a single driver or multiple drivers, of a single topology or multiple topologies, without limitation to the number of loads or drivers. These methods are intended specifically for control of an LED flashlight, but apply to any electrical load. Feedback and control loops typically use resistors, and are typically connected to the cathode of the circuit. However, some are anode based, and others still use capacitors and inductors in different arrangements in the circuit to affect changes in output voltage or current. The methods here function regardless of the location of the feedback loop, and regardless of whether the circuit element is resistive, or non-resistive.

III. Conclusion

It is contemplated that any optional feature of the inventive variations described may be set forth and claimed independently, or in combination with any one or more of the features described herein. Reference to a singular item, includes the possibility that there is a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the to be appended claims. It is further noted that the appended claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the to be appended claims shall allow for the inclusion of any additional element irrespective of whether a given number of elements are enumerated in the to be appended claim, or the addition of a feature could be regarded as transforming the nature of an element set forth in the to be appended claims. Except as specifically defined herein, all technical and scientific terms used herein are to be given as broad a commonly understood meaning as possible while maintaining to be appended claim validity.

The breadth of the present invention is not to be limited to the examples provided and/or the subject specification, but rather only by the scope of the to be appended claim language. Use of the term "invention" herein is not intended to limit the scope of the appended claims in any manner. Rather it should be recognized that the "invention" includes the many variations explicitly or implicitly described herein, including those variations that would be obvious to one of ordinary skill in the art upon reading the present specification. Further, it is not intended that any section of this specification (e.g., the Summary, Detailed Description, Abstract, Field of the Invention, etc.) be accorded special significance in describing the invention relative to another or the to be appended claims. All references cited are incorporated by reference in their entirety. Although the foregoing invention has been described in detail for purposes of clarity of understanding, it is contemplated that certain modifications may be practiced within the scope of the to be appended claims.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An apparatus comprising:
   a load having a load requirement;
   an initial power source;
   a microcontroller;
   a plurality of drivers, wherein each of the plurality of drivers has a driver efficiency and is connected to the initial power source, to the microcontroller and to the load;
   a control circuit connected to the microcontroller and to each of the plurality of drivers;
   wherein the microcontroller selectively activates at least one of the plurality of drivers based on the driver efficiency of the at least one of the selected plurality of drivers, the initial power source, and the load requirement;
   wherein the selective activation of at least one of the plurality of drivers by the microcontroller occurs via the control circuit; and
   wherein the control circuit comprises a plurality of resistors.

2. The apparatus as in claim 1, wherein the control circuit further comprises a plurality of transistors that selectively activate and deactivate the plurality of resistors.

3. The apparatus as in claim 1 wherein the load comprises a single light-emitting diode.

4. The apparatus as in claim 1 wherein the load comprises a plurality of light-emitting diodes.

5. The apparatus as in claim 1 wherein the load comprises a single light-emitting diode and an array of light-emitting diodes.

6. The apparatus as in claim 1 wherein the plurality of drivers includes at least one boost driver.

7. The apparatus as in claim 1 wherein the plurality of drivers includes at least one buck driver.

8. An apparatus comprising:
   a load having a load requirement;
   an initial power source;
   a microcontroller having a microcontroller program;
   a microcontroller actuator;
   a first driver connected to the initial power source and to the load;
   a second driver connected to the initial power source and to the load;
   wherein the first driver operates when activated by the microcontroller and outputs approximately the load requirement if the initial power source is less than the load requirement;
   wherein the second driver that operates when activated by the microcontroller and outputs approximately the load requirement if the initial power source is greater than the load requirement;
   a control loop including the microcontroller, the first driver, the second driver, and the initial power source;
   wherein the microcontroller is selectively activated by the microcontroller actuator; and wherein when the microcontroller is activated by the microcontroller actuator, the microcontroller selectively activates the first driver or the second driver via the control loop based on the initial power source and the load source.

9. The apparatus as in claim 8 further comprising a switch connected to the microcontroller actuator and capable of sending ON signals having an ON pulse and OFF signals having an OFF pulse;
   whereby the microcontroller adjusts the activation of the first driver and the second driver based on the microcontroller program and based on the on pulses and off pulses received by the microcontroller actuator.

10. The apparatus as in claim 9 wherein the switch is an analog switch.

11. The apparatus as in claim 9 wherein the switch is a digital switch.

12. The apparatus as in claim 9, wherein the selective activation by the microcontroller does not use pulse-width modulation.

13. The apparatus as in claim 8 further comprising a potentiometer having a dynamic potentiometer voltage and a dynamic potentiometer voltage reader;
   whereby the microcontroller adjusts the activation of the first driver and the second driver based on the microcontroller program and the dynamic potentiometer voltage read by the dynamic potentiometer voltage reader.

14. The apparatus as in claim 13 wherein the potentiometer is a digital potentiometer.

15. The apparatus as in claim 8 further comprising a magnetic detector having a magnetic switch that is selectively activated or deactivated based on the presence or absence of a magnetic field;
   wherein the magnetic switch is connected to the microcontroller actuator;
   whereby the microcontroller adjusts the activation of the first driver and the second driver based on the microcontroller program and the magnetic switch.

16. The apparatus as in claim 15 wherein the magnetic switch operates by ON and OFF pulses.

17. The apparatus as in claim 15 wherein the magnetic switch operates by dynamic signals.

18. An apparatus comprising:
   a load having a load requirement;
   an initial power source;
   a microcontroller;
   a plurality of drivers, wherein each of the plurality of drivers has a driver efficiency and is connected to the initial power source, to the microcontroller and to the load;
   a control circuit connected to the microcontroller and to each of the plurality of drivers;
   wherein the microcontroller selectively activates at least one of the plurality of drivers based on the driver efficiency of the at least one of the selected plurality of drivers, the initial power source, and the load requirement;

wherein the selective activation of at least one of the plurality of drivers by the microcontroller occurs via the control circuit; and wherein the control circuit comprises a digital potentiometer.

19. The apparatus as in claim 18 wherein the load comprises a single light-emitting diode.

20. The apparatus as in claim 18 wherein the load comprises a plurality of light-emitting diodes.

21. The apparatus as in claim 18 wherein the load comprises a single light-emitting diode and an array of light-emitting diodes.

22. The apparatus as in claim 18 wherein the plurality of drivers includes at least one boost driver.

23. The apparatus as in claim 18 wherein the plurality of drivers includes at least one buck driver.

* * * * *